Patented Oct. 19, 1943

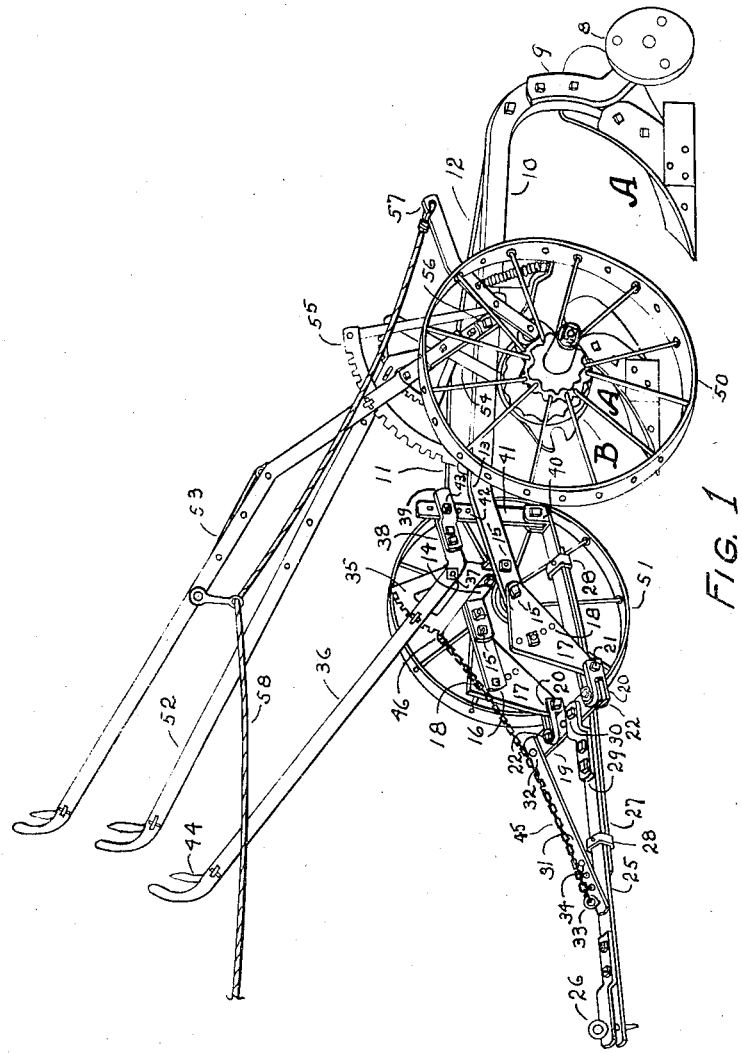

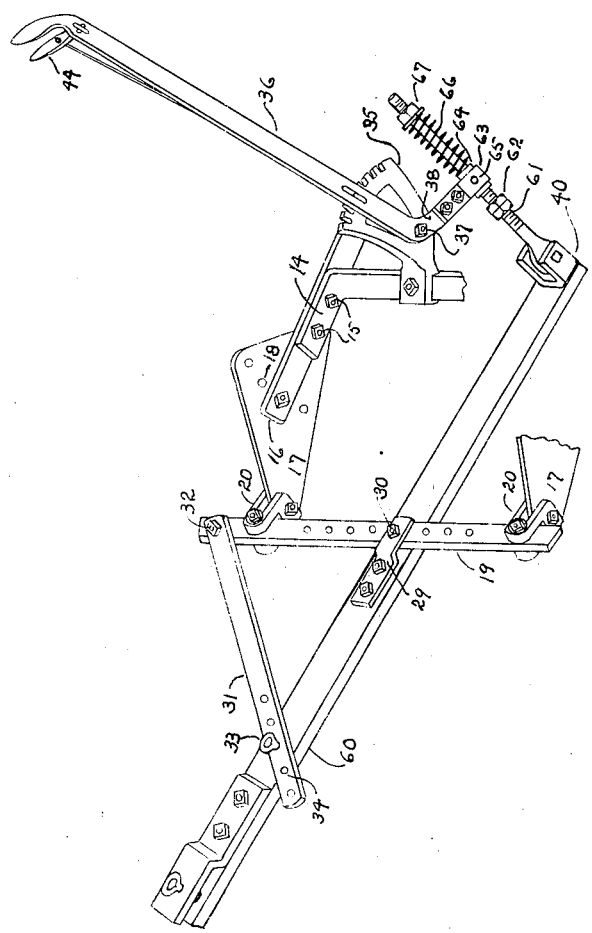

2,332,065

UNITED STATES PATENT OFFICE 2,332,065

REAR PRESSURE HITCH FOR PLOWS

George Ross Ego, Brantford, Ontario, Canada, assignor to Massey-Harris Co. Ltd., Toronto, Ontario, Canada, a limited company of Canada Application February 1, 1941, Serial No. 376,958

3 Claims. (Cl. 97—103)

The present invention relates to tractor drawn gang plows generally having one or two bottoms and power lifting devices, including means whereby when the plow is lifted out of the ground, the rear end of the plow may be held at a predetermined height from the ground.

In plows of the class, the front bottom is usually positioned adjacent the furrow wheel and the rear bottom being positioned a conventional distance in rear of the front bottom.

The weight of the bottoms and the parts of the beams in rear of the wheels is not very much greater than the weight of the levers and parts of the beams in front of the wheels. Therefore there is not very much weight available for holding the bottoms into the ground.

The principal object of the present invention is to provide a plow of the class wherein the bottoms may be yieldingly held into the ground and at the same time, means are provided for overcoming this additional yielding pressure when the plows are out of the ground.

An object of the present invention is to provide an adjustable stop which is secured to the forward end of the hitch or draw bar and to the forward part of the plow frame considerably above the rear end of the draw bar whereby by changing the length of this adjustable stop, the plow bottoms may be regulated as to their height when they are lifted out of the ground but whereby the stop will not effect the pressure applied to hold the bottoms in the ground.

The above objects are accomplished by means of parts, combinations of parts, or their equivalents, and mode of operation, as hereinafter set forth and claimed and shown in the accompanying drawings in which:

Fig. 1 is a perspective view of a two bottom gang plow equipped with the preferred form of my invention.

Fig. 2 is an enlarged perspective view of a modification.

As thus illustrated, reference character A designates the plow bottoms, in their entireties. Numeral 10 designates the land side beam to which the rear bottom is suitably secured and numeral 11 designates the furrow side beam which is considerably shorter than the land side beam and to which the front bottom is secured.

The rear ends of beams 10 and 11 are secured together in any suitable manner preferably by means of a brace 12. A rear furrow wheel 8 is secured to beam 10 by means of a bracket 9 whereby the weight of the rear end of the plow is wheel carried when in an operating position. This wheel cooperates with the levers to regulate the depth plowed.

Beams 10 and 11 extend forwardly and downwardly from points which are in transverse alignment as at 13—13. A U-shaped brace 14 forms a rigid connection between the front ends of the beams and is secured to the beams by means of bolts 15.

The ends of beams 10 and 11 terminate as at 16. Plates 17—17 shaped somewhat as illustrated, are secured at their rear ends to the beams by front bolts 15.

Each of the plates 17 is provided with a series of apertures 18 which are on a radius with front bolts 15, the front ends of the beams having apertures which will register with any one of apertures 18. Therefore plates 17 may be moved around bolts 15 as an axis, thus to regulate the height of the front ends of these members to which transverse hitch bar 19 is secured as follows:

Clevises 20—20 are pivotally secured to members 17 as at 21—21 and to bar 19 as at 22—22. I provide a hitch bar 25 having a clevis arrangement at the forward end, preferably as illustrated, whereby a linchpin 26 may be used with which to form an operating connection with the draw bar of the tractor.

Hitch bar 25 may, for its entire length, be made from spring steel or high carbon extensions may be provided at each end of a spring steel bar. I provide preferably a spring steel leaf 27, the ends of which are slidably anchored to member 25 by means of clips 28—28.

I provide a clevis plate 29 which is suitably secured to members 25 and 27, the rear end extending over bar 19 and having a bolt or clevis pin 30 which extends through any one of a number of openings in member 19. Thus it will be seen that the hitch bar may be moved transversely on bar 19.

A brace 31 is provided which is anchored to the furrow side of bar 19 by means of a bolt as at 32 and to the hitch bar by means of a bolt as at 33. Brace 31 is provided preferably at its forward end with a series of apertures 34. Thus clearly, the front end of the hitch bar may be adjusted transversely, making it possible to lock the front or center of the hitch bar in any desired transverse position. It is necessary to provide the adjusting means on member 19 and the adjusting means for the front end of the hitch bar so the rear end of member 25 may always be positioned directly under its connection to the lever.

I provide a sector 35 which is secured to brace 14, as illustrated, and having a lever 36 pivotally mounted thereto as at 37, the lever having a rearwardly extending portion 38 and a plate 39, the rear end of which is spaced a distance from the rear end of member 38.

I provide a U-shaped bracket 40 which is swivelly secured to member 25 by means of a bolt (not shown). A link 41 is pivoted to member 40, as illustrated, and positioned between the rear ends of members 38 and 39 and having a series of apertures 42 whereby the length of the connection between member 40 and members 38 and 39 may be adjusted by means of a bolt 43.

Lever 36 is provided with a hand latch 44 having an operatively connected tongue adapted to engage the teeth in sector 35. Thus it will be seen that when the plow is in the ground and operating normally, link 41 may be adjusted so lever 36 will be held, if desired, in a medial position. If lever 36 is moved forwardly, a yielding pressure will be added to the rear ends of the beams and as this lever is moved rearwardly, this pressure may be reduced or caused to exert a lifting pressure on the rear ends of the beams. Clearly, therefore, by the proper adjustment of link 41 and lever 36, any necessary pressure may be added in order to keep the bottoms in the ground.

From the foregoing, it will be seen that when the bottoms are lifted from the ground at a time when considerable yielding pressure is placed on the bottoms, they will not be sufficiently lifted to clear the trash.

In order to cause the bottoms to lift definitely to a desired height above the ground, I provide preferably a chain 45 which is anchored to sector 35 as at 46, the front end being anchored to the hitch as at 33, either end of the chain being arranged so its length may be adjusted whereby the plow bottoms will be lifted a desired height above the ground at all times irrespective of the position of lever 36.

In the present device, I provide a land wheel 50 and a furrow wheel 51, each being mounted on cranked axles and having an interconnection which is adjustably controlled by lever 52 as is the custom in plows of the class.

I provide a power lift which, in its entirety, is designated by reference character B, one part of which is secured to wheel 50, the other part being mounted on a stub axle having a crank (not shown), the crank being suitably connected to lever 52 by means of a link 54. Wheel 50 and its part of the clutch are rotatably mounted on the stub axle and the stub axle is rotatably mounted in a bracket which is secured to the free end of the land axle.

Lever 53 is pivoted to sector 55 as at 56 and has the usual hand latch and tongue adapted to engage the teeth in the sector. Thus, by moving lever 53 forwardly or rearwardly, the plow may be adjusted as to depth.

The usual power lift clutch operating lever 57 is provided having a rope 58 which extends forwardly to within reach of the operator of the tractor. The clutch is arranged to turn one half turn every time rope 58 is pulled so the plow may be lifted out of the ground and then lowered into the ground by the operator while seated on the tractor.

Thus it will be seen that I have provided a conventional one or two bottom tractor plow having means whereby pressure may be added at will on the bottoms for holding them into the ground and wherein this pressure adjustment will not effect the lifted position of the bottoms.

In Figure 2, I illustrate a modification wherein a draw bar 60 is made very heavy and rigid; all of the parts directly attached to the draw bar being the same as that shown in Figure 1.

In this modification, I provide yielding means between the lever and the draw bar, as illustrated, wherein an I-bolt 61 is hingedly connected to the U-shaped bracket 40. Bolt 61 is provided with adjusting nuts 62 which are screw threaded on the bolt. The bell crank portion of lever 36 differs somewhat from that shown in Figure 1 in that a strap 63 is adapted to loosely embrace a block 64, the block being pivoted in the lever and strap as at 65.

By adjusting nuts 62, the rear end of the plow frame will be lifted to the desired height by contact of the nuts with block 64 as the plow is lifted out of the ground. Clearly therefore, chain 45 may be dispensed with.

In order to provide yielding pressure on the rear end of the plow frame, bolt 61 is slidably extended upwardly through block 64 for a distance and is provided with a spring 66 and a nut 67. Thus it will be seen that by moving the lever forward, as in the other design, yielding pressure may be added to the rear end of the frame.

Clearly nut 67 may be adjusted for determining the position of lever 36 and after nut 67 has been adjusted, the position of lever 36 determines the pressure on the rear end of the plow.

Clearly many minor detail changes may be made without departing from the spirit and scope of the present invention as recited in the appended claims.

Having thus shown and described my invention, I claim:

1. A tractor drawn plow of the class described, comprising a frame having carrying wheels vertically adjustably mounted on opposite sides of and a distance in rear of the front end thereof, carrying means at the rear end of the frame, a draw bar transversely hingedly connected intermediate its ends to the front end of said frame the front end of said draw bar adapted to be connected to the tractor, manual adjusting means attached to the frame of the plow and to the rear end of said draw bar, whereby the front end of the draw bar may be adjusted vertically relative to the frame of the plow, said draw bar having one or more reinforcing plates, the draw bar and plates having spring characteristics whereby yielding down pressure may be optionally added to the rear end of said frame, means connecting the forward end of said draw bar to said frame a distance above said draw bar hinge adapted to limit the down movement of the front end of the draw bar relative to the frame.

2. A plow of the class described, comprising a frame having ground working tools secured to the rear end thereof and a pair of supporting wheels spaced a distance in rear of the front end thereof, a transverse bar connected to the front end of said frame by spaced apart hinges, a hitch member anchored to said transverse bar intermediate its ends, a brace forming a connection from one end of said transverse bar to one end of said hitch member, said hitch member adapted to be connected at its front end to a tractor, manually adjustable means forming a connection between the rear end of said hitch member and said frame whereby the rear end of said hitch member may be raised and lowered relative to the frame, said hitch bar being rectangular in cross section and relatively wide and having spring characteristics whereby yielding down pressure may be added to the rear end of said frame when in an operating position.

3. A tractor drawn plow of the class described, comprising a frame having carrying wheels vertically adjustably mounted on opposite sides of and a distance in rear of the front end thereof, earth turning means secured to the rear end of said frame, carrying means secured to the rear end of said frame and positioned in rear of and adjacent the rear end of said earth turning means, a draw bar transversely hingedly connected intermediate its ends to the front end of said frame, the front end of said draw bar adapted to be connected to the tractor, a manually adjustable lever attached to said frame and to the rear end of said draw bar with means whereby the rear end of the draw bar may be adjusted vertically relative to the frame, means associated with said lever and draw bar adapted to exert a yielding down pressure on the rear end of said frame, a limit stop member connecting the forward end of said draw bar to said frame a distance above said draw bar hinge and adapted to limit the down movement of the rear end of the frame relative to the draw bar.

GEORGE ROSS EGO.